United States Patent [19]

Sugasawa et al.

[11] 4,245,471
[45] Jan. 20, 1981

[54] STOICHIOMETRIC AND ENRICHMENT MIXTURE CONTROL DURING DIFFERENT SPLIT ENGINE MODES

[75] Inventors: Fukashi Sugasawa, Yokohama; Haruhiko Iizuka; Junichiro Matsumoto, both of Yokosuka, all of Japan

[73] Assignee: Nissan Motor Company, Limited, Yokohama, Japan

[21] Appl. No.: 48,156

[22] Filed: Jun. 13, 1979

[30] Foreign Application Priority Data

Jun. 16, 1978 [JP] Japan ................................. 53-72850

[51] Int. Cl.³ .......................... F01N 3/15; F02D 17/00
[52] U.S. Cl. ........................................ 60/276; 60/301; 123/198 F
[58] Field of Search .............. 123/198 F; 60/276, 301; 123/32 EE, 119 EC

[56] References Cited

U.S. PATENT DOCUMENTS

| | | | |
|---|---|---|---|
| 3,767,764 | 10/1973 | Dolbear | 60/301 |
| 3,984,975 | 10/1976 | Price | 60/301 |
| 4,107,921 | 8/1978 | Iizuka | 123/198 F |
| 4,114,374 | 9/1978 | Tanahashi | 123/198 F |

Primary Examiner—Douglas Hart
Attorney, Agent, or Firm—Schwartz, Jeffery, Schwaab, Mack, Blumenthal & Koch

[57] ABSTRACT

A control system for a multi-cylinder internal combustion engine comprises a split engine control unit for operating the engine on partial cylinders when reduced engine power can adequately operate the vehicle, and first and second upstream exhaust conduits for directing exhaust gases from first and second group cylinders respectively to a common junction to which a common downstream exhaust conduit is connected for emitting the gases to the atmosphere. A first catalytic converter is disposed in the second exhaust conduit to be exposed to the stream of gases exhausted from the second group cylinders which are activated at all times and a second catalytic converter is disposed in the common downstream conduit to be exposed to the stream of gases exhausted from the first group cylinders directed through the first conduit and to the gases passed through the first catalytic converter. An exhaust gas sensor is provided in the common exhaust conduit upstream of the downstream converter. A feedback control circuit is responsive to signals from the gas sensor to effect closed loop mixture control in which the air-fuel mixture supplied to all the cylinders during the full cylinder mode is controlled to the stoichiometric point so that both converters each promote simultaneous reduction of the NOx component and oxidation of the HC and CO components. A feedback control disabling circuit is provided which is effective during the partial cylinder mode for controlling the air-fuel ratio to the rich side of the stoichiometric point to promote reduction of the NOx component in the first converter and oxidation of the HC and CO components in the second converter.

6 Claims, 5 Drawing Figures

STOICHIOMETRIC AND ENRICHMENT MIXTURE CONTROL DURING DIFFERENT SPLIT ENGINE MODES

BACKGROUND OF THE INVENTION

The present invention relates to control systems for multiple cylinder internal combustion engines, and in particular to a control system which comprises closed-loop mixture control and split engine operations.

It is known that fuel economy is achieved under light load conditions by operating a multiple cylinder engine on partial cylinders if the reduced engine power can adequately operate the vehicle. When the engine load is relatively heavy the engine is operated on full cylinders. The whole cylinders are thus divided into a first group which is at all times operated and a second group which is operated under heavy load. This method of engine control is known as split engine operation. On the other hand, closed-loop mixture control systems are also known and widely used as an effective means of eliminating noxious gaseous components. Such systems employ an exhaust gas sensor and a three-way catalytic converter disposed downstream of the gas sensor to effect simultaneous oxidation of hydrocarbon and monoxide and reduction of nitrogen oxides when the air-fuel ratio is precisely controlled to within a predetermined range, known as converter window which corresponds to the stoichiometric air-fuel ratio.

However, the above known methods cannot be combined together without giving rise to a problem in that the deactivated cylinders under light load operate as a pump to introduce air into the exhaust system thereby increasing oxygen contents, which results in a false gas sensor signal. To prevent this problem, a prior method involves the use of a shutoff valve to direct the stream of pumped air through a passage that bypasses the catalytic converter during partial cylinder mode and switch the direction of the gas flow to the catalytic converter during the full cylinder mode.

However, because of the inherent delay time the exhaust gas takes to reach the location of the shutoff valve, the signal that controls the shutoff valve must be precisely timed in relation to the delay time and if improperly timed a false gas sensor signal would result.

SUMMARY OF THE INVENTION

Accordingly, an object of the present invention is to provide a control system for a multi-cylinder internal combustion engine which effects reduction of noxious gas components during transient periods when the engine operation is a switched between full and partial cylinder modes.

The present invention contemplates the use of first and second upstream exhaust passages for directing gases exhausted from first and second cylinders of the engine respectively to a common joint to which a common downstream exhaust passage is connected for passing exhaust gases to the atmosphere, and the use of a first catalytic converter disposed in the second upstream exhaust passage, a second catalytic converter disposed in the common downstream exhaust passage and an exhaust gas sensor in the common exhaust passage upstream of the second converter. A split engine control unit is provided to effect full cylinder engine operation in which both first and second cylinders are activated when the engine load is above a predetermined value and effect partial cylinder engine operation in which the first cylinder is deactivated allowing a stream of air to be pumped therethrough when the engine load is below the predetermined value. A feedback control circuit is responsive to a signal from the exhaust gas sensor during the full cylinder operation to control the air-fuel mixture ratio to the stoichiometric point. The upstream and downstream converters effectively operate independently to promote simultaneous reduction of the NOx component and oxidation of the HC and CO components within their respective narrow catalytic conversion windows.

During the partial cylinder mode, the feedback control signal is clamped to a predetermined voltage level which corresponds to a rich mixture ratio so that the mixture supplied to the activating second cylinder is enriched with respect to the stoichiometric point. This allows the upstream converter to promote reduction of the high content NOx component at a maximum conversion efficiency, while allowing the low content HC and CO components to be mixed with the air pumped from the deactivated first cylinder for purposes of promoting oxidation of these components in the downstream converter at a maximum conversion efficiency.

Another object of the present invention is therefore to promote reduction of the NOx component in a first catalytic converter and oxidation of the HC and CO components in a second catalytic converter by enriching the mixture during the partial cylinder engine operation, while promoting simultaneous reduction of NOx and oxidation of HC and CO in each converter by controlling the mixture to the stoichiometric point during the full cylinder operation.

BRIEF DESCRIPTION OF THE DRAWINGS

The invention will be further described by way of example with reference to the accompanying drawings, in which.

DETAILED DESCRIPTION

Figure 1:
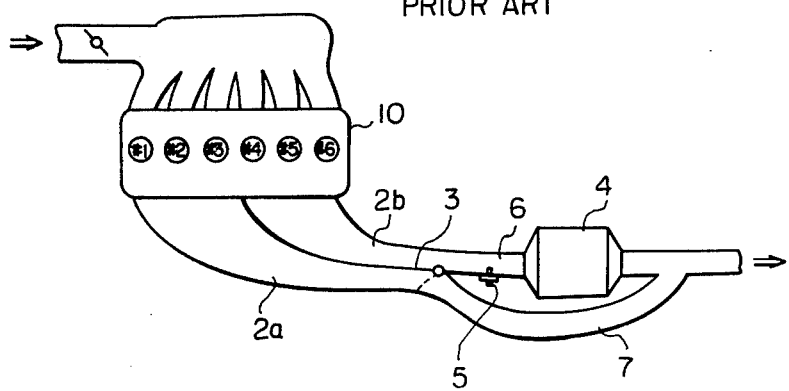
FIG. 1 is a schematic diagram illustrating the prior art arrangement.

Before describing the present invention reference is first made to FIG. 1 in which the prior art closed-loop mixture controlled split engine operating system is schematically illustrated. In FIG. 1, the first group cylinders No. 1 to No. 3 of an engine 10, which are deactivated under light load conditions, communicate through an exhaust conduit 2a and a conduit 7 to the atmosphere, while the second group cylinders No. 4 to No. 6, which are activated at all times, communicate through conduit 2b and a common passage 6 to a three-way catalytic converter 4 and thence to the atmosphere.

In the common conduit 6 is provided an exhaust gas sensor 5 to generate a gas sensor output signal for feedback control purposes. A selector valve 3 is provided between the conduits 2a and 2b to assume a position indicated by broken lines to direct the exhaust gases from the first group cylinders to the common conduit 6 during full cylinder engine operation and operated to assume a second position indicated by a solid line to allow the air pumped from the deactivated cylinders to pass through the conduit 7, which bypass the gas sensor 5 and catalytic converter 4, when the engine is operated on partial cylinders.

If the selector valve 3 is activated at a point in time which is earlier than the time at which the engine operation is switched from partial to full cylinder modes, a certain amount of residual air from the previously deactivated cylinders tends to mix with the exhaust gases from the activating cylinders in the common conduit 6, whereby the gas sensor 5 will generate a signal which is an indication that an excessive amount of air is present in the exhaust gases. This results in an excessively enriched mixture and a decrease in efficiency for reducing the NOx components. Conversely, if the valve switching is delayed from the time the operational mode is switched from partial to full cylinders, the burnt gases exhausted from the first group cylinders are allowed to bypass the catalytic converter 4. Similar undesirable consequences tend to occur when the mode is switched from full to partical cylinders.

Figure 2:
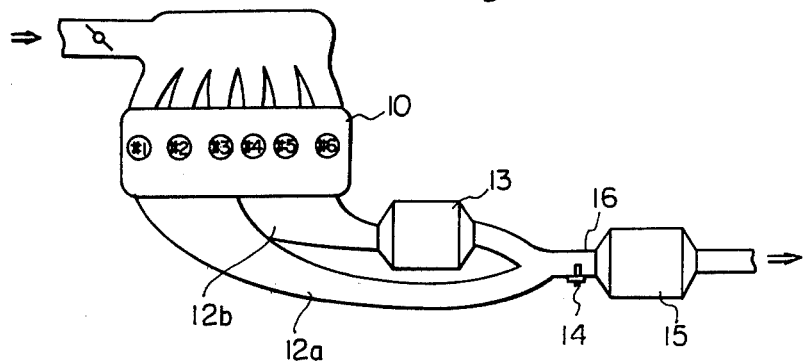
FIG. 2 is a schematic diagrammatic view showing an arrangement according to the invention.

In FIG. 2 the engine control system of the invention is shown as comprising a first upstream exhaust conduit 12a connected to the first group cylinders No. 1 to No. 3 for leading the exhaust gases therefrom to a common downstream exhaust conduit 16 and a second upstream exhaust conduit 12b connected to the second group cylinders No. 4 to No. 6 for leading the exhaust gases therefrom to the common passage 16 through a first three-way catalytic converter 13. In the common exhaust passage 16 are disposed a second three-way catalytic converter 15 and an exhaust gas or oxygen sensor 14 upstream of the second converter 15.

Figure 3:
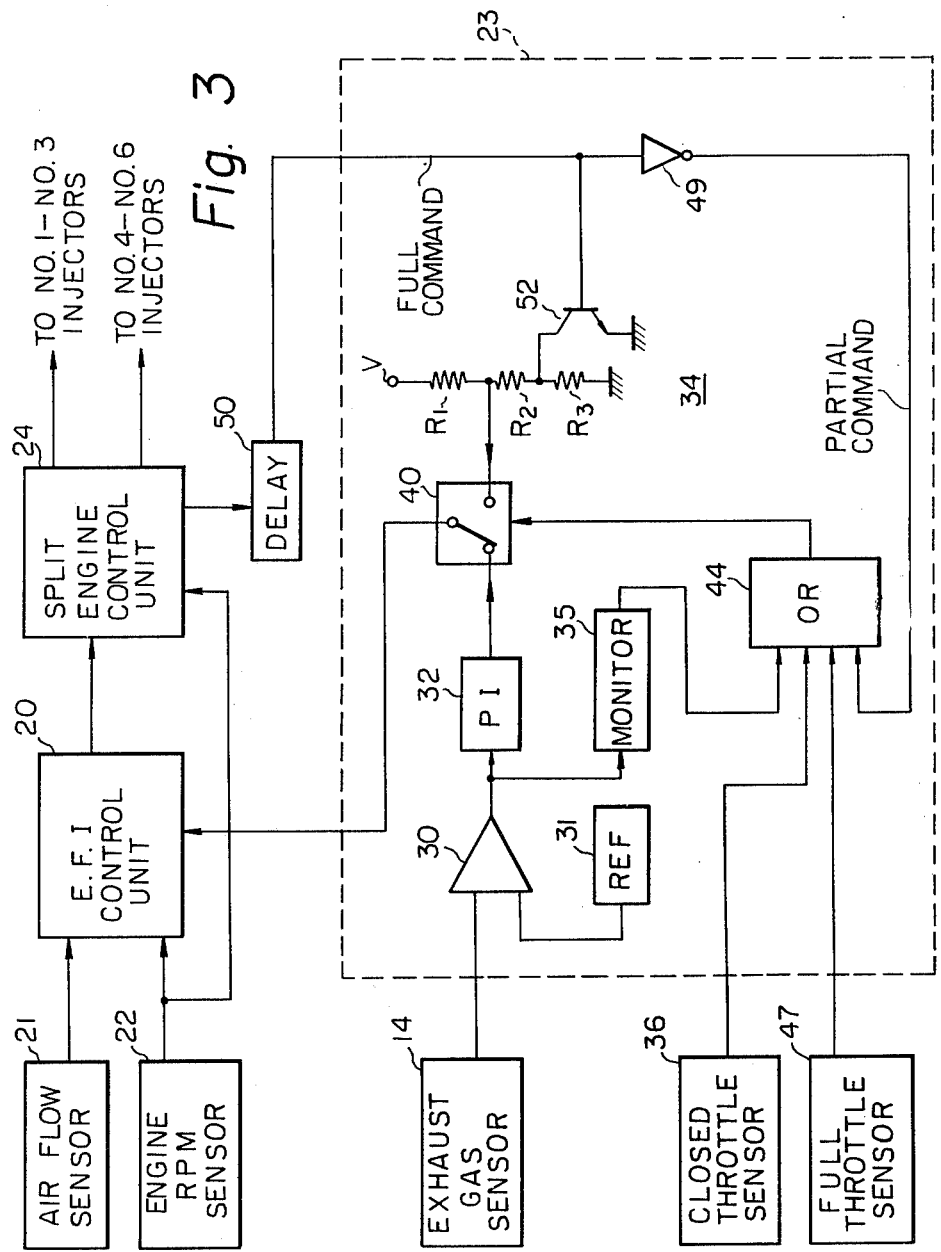
FIG. 3 is a circuit diagram associated with the arrangement of FIG. 2.
Figure 4:
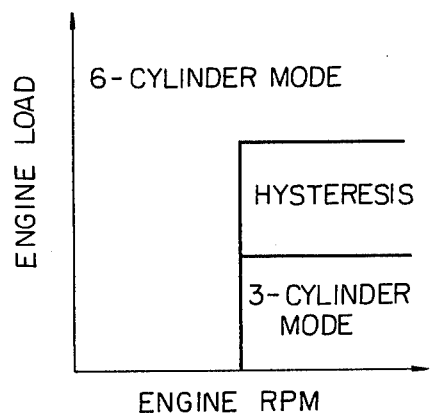
FIG. 4 is an explanatory graphic diagram of the split engine control circuit of FIG. 3.

FIG. 3 is an illustration of the control circuit of the invention. An electronic fuel injection control unit 20 takes its inputs from an intake air flow sensor 21 and from an engine speed sensor 22 and computes on these input data to obtain an air quantity taken in per engine crankshaft revolution and derives an injection pulse with a length proportional to the computed air quantity that represents the engine output power or load. The injection pulse is supplied in synchronism with crankshaft revolution to a split engine control circuit 24 and thence to the first group cylinders No. 1 to No. 3 and also to the second group cylinders No. 4 to No. 6. The split engine control circuit 24 is also responsive to signals from the engine speed sensor 22 to detect whether the engine speed is above or below a predetermined value. The split engine control circuit 24 includes means responsive to the pulse length of the injection pulse to detect the magnitude of engine load to generate a full cylinder mode command signal when the detected engine load is above a preselected value provided that the engine is above the predetermined value or when the engine speed is below the predetermined value the full cylinder mode command signal is generated regardless of the engine load, as illustrated in FIG. 4. The full cylinder mode command signal enables the injection pulses to be supplied to all of the fuel injectors. If the engine speed is above the preselected value and the engine load is below that preselected value, the split engine control unit 24 generates a partial cylinder mode command signal and this enables the injection pulses to be applied only to fuel injectors No. 4 to No. 6 associated with the second group cylinders No. 4 to No. 6, respectively, and disables the remainder injectors.

To prevent the split engine control system to repeatedly switch between partial and full cylinder modes as the detected engine load crosses the preselected threshold value due to insignificant variations of engine load, the circuit 24 is also provided with means for providing a hysteresis characteristic which permits the system to maintain the previous operational mode even though the engine load varies immediately following the mode switching event (FIG. 4).

A feedback control circuit 23 is provided which includes a comparator 30 having a first input terminal connected to receive a signal from the exhaust gas sensor 14 for making a comparison with a reference voltage supplied from a source 31 representing the stoichiometric air-fuel ratio. The comparator 30 provides an output signal when the gas sensor 14 signal is above the reference voltage and feeds its output to a proportional integral controller 32 in which the amplitude of the comparator signal is modified with a predetermined proportionality factor and integration rate to minimize feedback control oscillation and improve response characteristic of the system when the engine is feedback controlled. The modified signal from the controller 32 is applied to the fuel injection control unit 20 through normally closed contacts of a switch 40 to modify the pulse length of the injection pulses for purposes of correcting the air-fuel ratio of mixture supplied to the engine to within a narrow catalytic conversion window of the converters 13 and 15.

Figure 5:
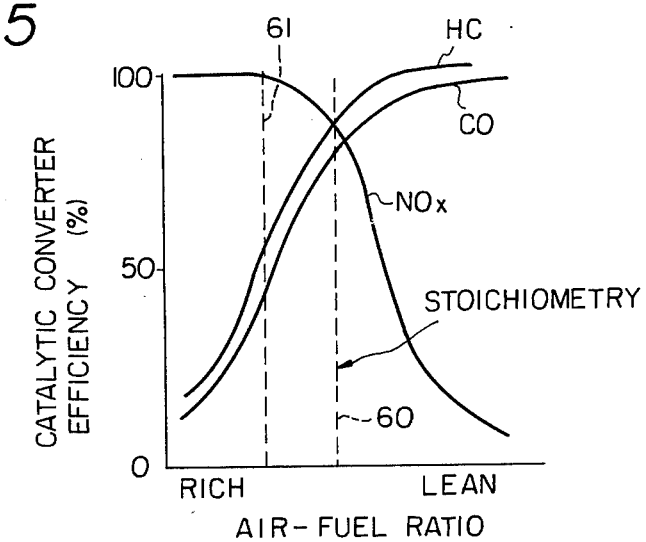
FIG. 5 is a graphic illustration of conversion efficiency of a three-way catalytic converter as a function of air-fuel ratios, useful for describing the partial cylinder operation.

The switch 40 forms a clamping circuit 34 along with OR gate 44, voltage monitor circuit 35, voltage divider formed by resistors R1, R2, R3, transistor 52 and inverter 49. This clamping circuit is responsive to input signals to the OR gate 44 to cause the switch 40 to close its normally open contacts to feed a preselected voltage developed at the junction of resistors R1 and R2 to the fuel injection control unit 20 to clamp the control signal to a desired point. When the split engine control unit 24 generates a low voltage, partial cylinder mode command signal, this signal is applied through a delay circuit 50 to the inverter 49 which inverts its polarity and applied to the OR gate 44 and thence to the switch 40 as a switching control signal, causing it to close its normally open contacts to supply a potential developed across the resistors R2 and R3. This potential is selected so that the mixture is enriched to the point as indicated by broken lines 61 in FIG. 5 which lies to the rich side of the stoichiometric point marked 60. Therefore, during the partial cylinder mode, the NOx component of emissions from the activated cylinders is converted in converter 14 at the maximum efficiency, while the HC and CO components are less converted and enter the common exhaust passage 16 where they are mixed with the air pumped from the deactivated cylinders No. 1 to No. 3. As a result oxidation of the HC and CO components is promoted in the downstream converter 15.

Under full cylinder operation in which mixture is controlled on the basis of the gas sensor derived feedback control signal, it is often desirable that the feedback operation be suspended whenever the engine is either accelerated or decelerated or gas sensor output remains low during engine cold start periods. Under these circumstances, the full cylinder mode command signal from the split engine control unit 24 turns on the transistor 52 to short-circuit the resistor R3 to thereby reduce the potential at the junction of resistors R1 and R2 to a level such that the air-fuel ratio is maintained at the stoichiometric point. For purposes of clamping the pulse length of the injection pulse to a value corresponding to the stoichiometric point under such undesirable conditions, closed throttle sensor 36 and a full throttle sensor 47 are provided to present signals to the OR gate 44 when throttle valve is nearly closed or fully opened, respectively. The monitor circuit 35 serves to detect when the gas sensor output remains low for an extended period of time and activates the OR gate 44. In response to these input signals, the OR gate 44 delivers a control signal to the switch 40 to cause it to apply the clamp voltage to the fuel injection control unit 20.

The purpose of the delay circuit 50 is to introduce a delay interval in response to the occurrence of a full cylinder mode command signal. This interval is sufficient to allow the residual air in the upstream conduit 12a to be completely exhausted through common conduit 16 when the engine operational mode is switched from the partial to full cylinder operation. Without this delay interval, the residual air would enter the common exhaust passage 16 to momentarily increase the oxygen content of the sensed gases and, as a result of the dilution, a false signal would result from the gas sensor 14. When the operational mode is switched from full to partial cylinders, the delay circuit 50 also provides a delay interval at the termination of the full cylinder command signal. This delay interval has the effect of allowing the possible slight difference in gas concentration between the emissions from the first and second group cylinders to reduce to a minimum.

The rich burn operation of the engine during the partial cylinder mode thus promotes oxidation of the HC and CO components in the downstream side catalytic converter 15. This serves to operate the downstream converter in the activated state during the partial cylinder mode and keeps it at high temperature conditions, with the result that when the mode is switched from the partial to full cylinders the downstream converter is capable of immediately providing simultaneous reduction and oxidation reactions. If during the partial cylinder mode the upstream converter 13 is fully activated to provide the simultaneous reaction process, the downstream converter 15 would be left inactivated with the result that its temperature will go low if the partial mode is continued for an extended period of time, causing it to be ineffective when the mode is switched from the partial to full cylinder operations. The present invention sucessfully avoids this problem by the rich burn engine operation.

What is claimed is:

1. A control system for an internal combustion engine having first and second cylinders, comprising:

split engine control means for operating said engine on full cylinders in which said first and second cylinders are activated to give higher engine power when the magnitude of engine load is above a predetermined value or operating said engine on partial cylinder in which only said second cylinder is activated to give lower engine power when the engine load magnitude is below said predetermined value and said first cylinder is deactivated to allow air to be pumped therethrough;

first and second upstream exhaust conduits for gases from said first and second cylinders when the engine is operated on full cylinders, respectively, to a common junction and for passing the pumped air from said first cylinder and the exhaust gases from said second cylinder to said common junction when the engine is operated on partial cylinder;

a common downstream exhaust conduit connected to said common junction for passing said gases therethrough to the atmosphere;

a first catalytic converter disposed in said second upstream exhaust conduit;

an exhaust gas sensor and a second catalytic converter disposed in said common downstream exhaust conduit;

feedback control means responsive to a signal from said exhaust gas sensor during the full cylinder engine operation for correcting the air-fuel ratio of mixture supplied to said first and second cylinders to the stoichiometric point; and means for disabling said feedback control means during the partial cylinder engine operation and controlling the air-fuel ratio of mixture supplied to said second cylinder to a point which lies to the rich side of the stoichiometric point, whereby during said full cylinder engine operation the NOx, HC and CO components of the gases from said first and second cylinders are purified simultaneously in said second and first catalytic converters, respectively, and during said partial cylinder engine operation the NOx component of the gases from said second cylinder is purified in said first catalytic converter and the HC and CO components thereof are mixed with said pumped air in said common exhaust conduit and purified in said second catalytic converter.

2. A control system as claimed in claim 1, further comprising delay interval introducing means responsive to the initiation of the full cylinder engine operation for introducing a delay interval sufficient to allow gases in said first exhaust conduit to be exhausted through said common exhaust conduit to the atmosphere to permit said feedback control means to respond to the signal from said exhaust gas sensor at the termination of said delay interval.

3. A control system as claimed in claim 1 or 2, further comprising delay interval introducing means responsive to the initiation of the partial cylinder engine operation for introducing a delay interval to permit said disabling means to operate at the termination of the last-mentioned delay interval.

4. A control system as claimed in claim 1, wherein said disabling means comprises means for clamping the voltage level of a signal from said feedback control means at a predetermined level during said partial cylinder engine operation for controlling the air-fuel mixture ratio to said rich side of the stoichiometric point.

5. A control system as claimed in claim 4, further comprising means for detecting an undesirable condition for the feedback control operation and disabling said feedback control means to control the air-fuel ratio of mixture supplied to said first and second cylinders to the stoichiometric point.

6. A control system as claimed in claim 1, wherein said exhaust gas sensor is located upstream of said second catalytic converter.

* * * * *